United States Patent
Yamashita et al.

(10) Patent No.: US 11,768,106 B2
(45) Date of Patent: Sep. 26, 2023

(54) PHOTOELECTRIC CONVERSION DEVICE FOR COUNTING A PULSE SIGNAL AND MEASURING A TIME WHEN A COUNT VALUE IS OUTPUT

(71) Applicant: CANON KABUSHIKI KAISHA, Tokyo (JP)

(72) Inventors: Yusuke Yamashita, Kanagawa (JP); Shigeharu Aoki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/850,572

(22) Filed: Jun. 27, 2022

(65) Prior Publication Data

US 2022/0412797 A1    Dec. 29, 2022

(30) Foreign Application Priority Data

Jun. 28, 2021    (JP) .................................. 2021-106531

(51) Int. Cl.
  *G01J 1/44*    (2006.01)
  *H04N 25/75*    (2023.01)

(52) U.S. Cl.
  CPC ................ *G01J 1/44* (2013.01); *H04N 25/75* (2023.01)

(58) Field of Classification Search
  CPC ...... G01J 1/44; G01J 2001/442; H04N 5/378; H04N 25/75; H04N 25/77; H04N 25/773
  USPC ........................................................ 250/208.1
  See application file for complete search history.

(56) References Cited

U.S. PATENT DOCUMENTS

| | | | | |
|---|---|---|---|---|
| 9,036,060 B2 * | 5/2015 | Kaizu | .................. | H04N 5/3591 |
| | | | | 348/273 |
| 9,210,350 B2 * | 12/2015 | Dai | ........................ | H04N 5/378 |
| 2018/0338102 A1 * | 11/2018 | Saito | .................. | H04N 5/37452 |
| 2018/0341837 A1 * | 11/2018 | Fitzsimmons | ....... | G06V 10/993 |

* cited by examiner

*Primary Examiner* — Que Tan Le
*Assistant Examiner* — Mai Thi Ngoc Tran
(74) *Attorney, Agent, or Firm* — CANON U.S.A., INC. IP Division

(57) ABSTRACT

A device includes a conversion unit, a generation unit configured to generate a pulse signal based on a signal from the conversion unit, a counter circuit configured to count the generated pulse signal, and a time measurement circuit configured to measure a time wherein one of a count value counted by the counter circuit or a time measurement value measured by the time measurement circuit is selectively output.

6 Claims, 14 Drawing Sheets

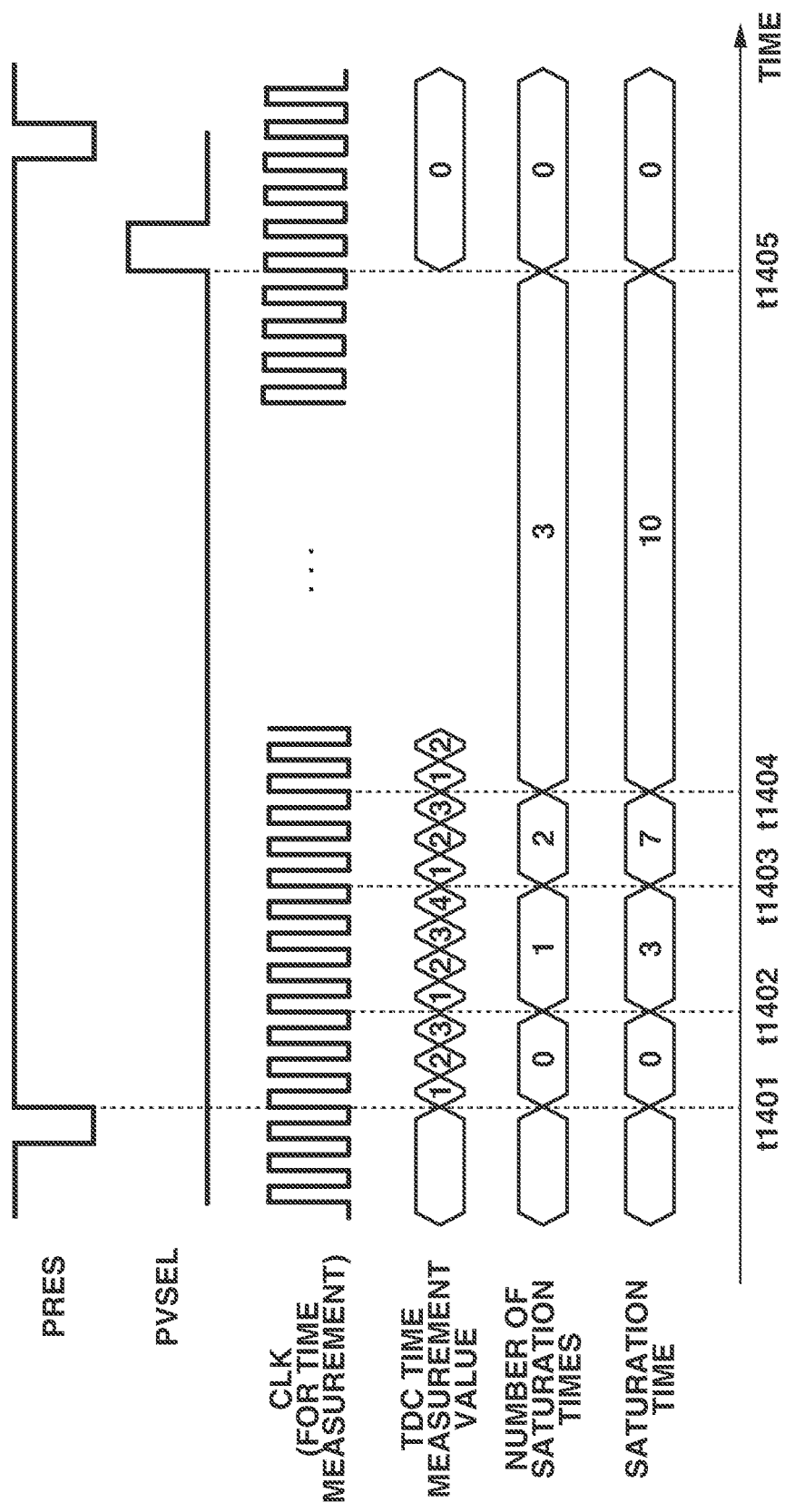

PHOTOELECTRIC CONVERSION DEVICE FOR COUNTING A PULSE SIGNAL AND MEASURING A TIME WHEN A COUNT VALUE IS OUTPUT

BACKGROUND

Technical Field

The aspect of the embodiments relates to a photoelectric conversion device.

Description of the Related Art

A photoelectric conversion device that digitally counts the number of photons arriving at an avalanche photodiode and outputs the count value as a photoelectrically-converted digital signal from a pixel is known. In terms of noise and signal calculation processing, digitalization of a pixel signal has a large benefit. An imaging apparatus in which a plurality of pixels each outputting a photoelectrically-converted digital signal are arranged has started to be spread. U.S. Pat. No. 9,210,350 discusses a method in which, in a case where the number of counted photons reaches a threshold in a time shorter than one frame in the above-described imaging apparatus, the time is measured, and the number of photons per one frame is determined from time information and the number of photons.

In the configuration discussed in U.S. Pat. No. 9,210,350, however, a counter for time measurement is connected to each of the pixels, which leads to an issue that a circuit scale is increased as a whole.

SUMMARY

According to an aspect of the embodiments, a device includes a conversion unit, a generation unit configured to generate a pulse signal based on a signal from the conversion unit, a counter circuit configured to count the generated pulse signal, and a time measurement circuit configured to measure a time wherein one of a count value counted by the counter circuit or a time measurement value measured by the time measurement circuit is selectively output.

Further features of the disclosure will become apparent from the following description of exemplary embodiments with reference to the attached drawings.

BRIEF DESCRIPTION OF THE DRAWINGS

FIG. 14 is a timing chart of the control according to the exemplary embodiment.

DESCRIPTION OF THE EMBODIMENTS

Figure 1:
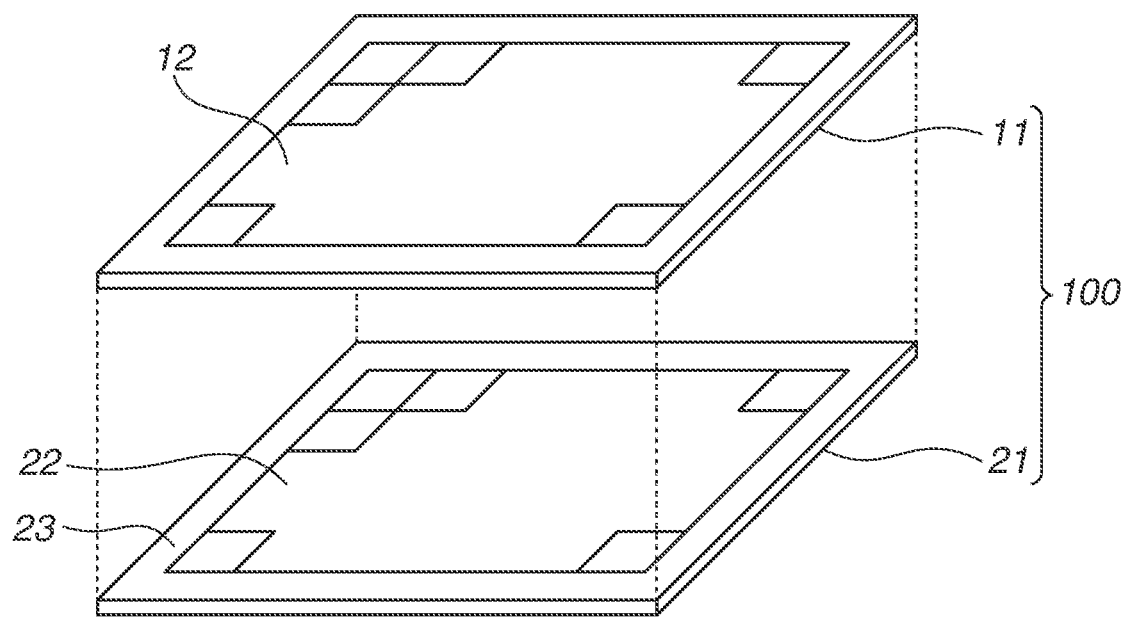
FIG. 1 is a diagram illustrating a configuration example of a photoelectric conversion device according to an exemplary embodiment.

FIG. 1 is a diagram illustrating a configuration example of a photoelectric conversion device according to an exemplary embodiment. As illustrated in FIG. 1, a photoelectric conversion device 100 includes a sensor chip 11 and a circuit chip 21 that are stacked and are electrically connected to each other. The sensor chip 11 includes a pixel area 12. The circuit chip 21 includes a pixel circuit area 22 to process signals detected in the pixel area 12 and a reading circuit area 23 to read out the signals from the pixel circuit area 22.

Figure 2:
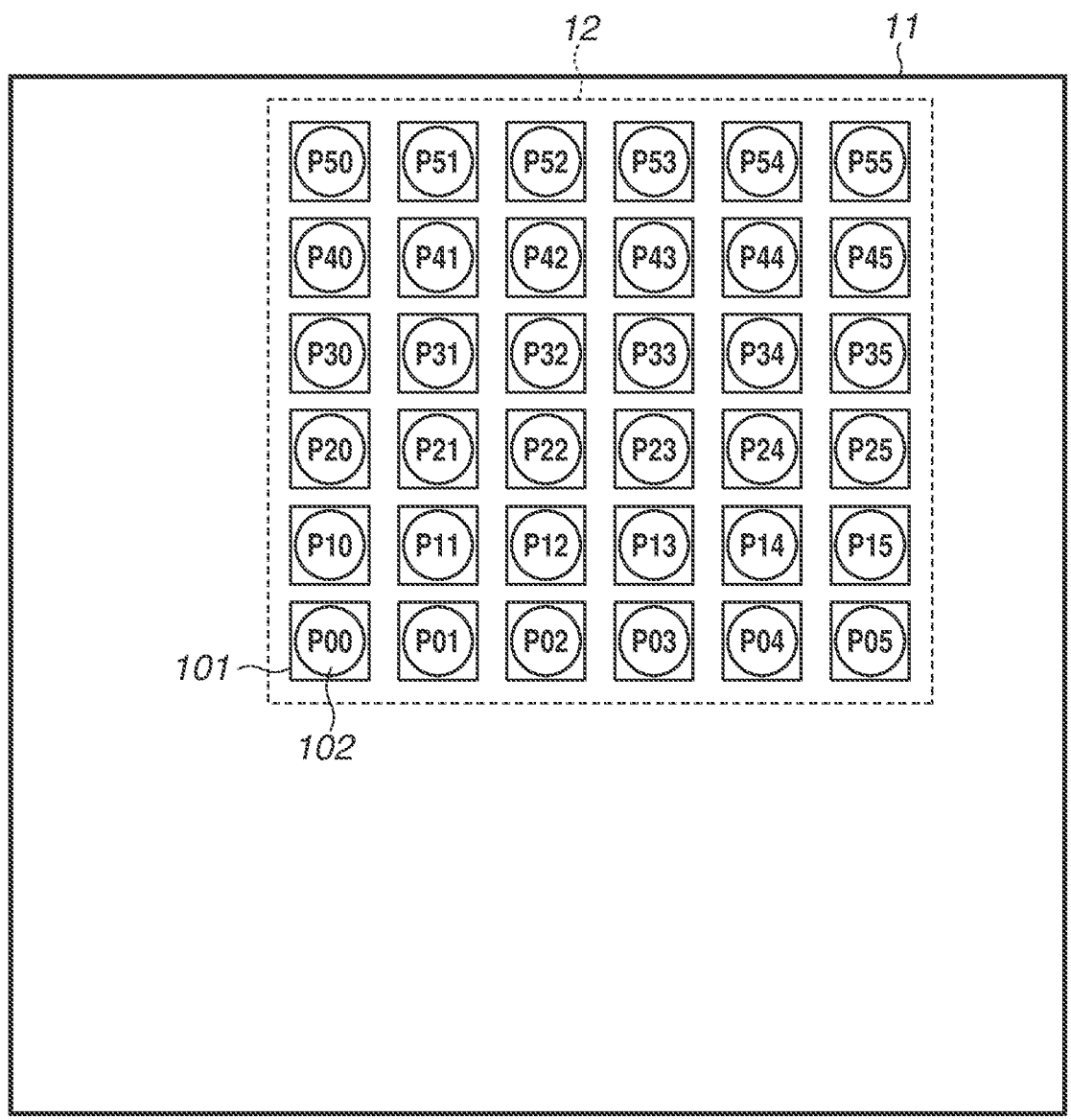
FIG. 2 is a diagram illustrating a configuration example of a sensor chip according to the exemplary embodiment.

FIG. 2 is a diagram illustrating a configuration example of the sensor chip 11. As illustrated in FIG. 2, the pixel area 12 of the sensor chip 11 includes a plurality of pixels 101 two-dimensionally arranged in a row direction and a column direction. Each of the pixels 101 includes a photoelectric conversion unit 102 including an avalanche photodiode (APD). FIG. 2 illustrates 36 pixels 101 that are arranged in six rows from a 0-th row to a fifth row and six columns from a 0-th column to a fifth column, with reference numerals indicating a row number and a column number. For example, a pixel 101 arranged in a first row and a fourth column is denoted by a reference numeral "P14". The number of rows and the number of columns of the pixels arranged in the pixel area 12 are not particularly limited.

The pixels 101 output a signal to generate an image; however, for example, in a case where the pixels 101 are used for a device for a time of flight (TOF) or the like, the pixels are not necessarily generate an image. In other words, the pixels 101 can measure a time when light arrives and a quantity of the light.

Figure 3:
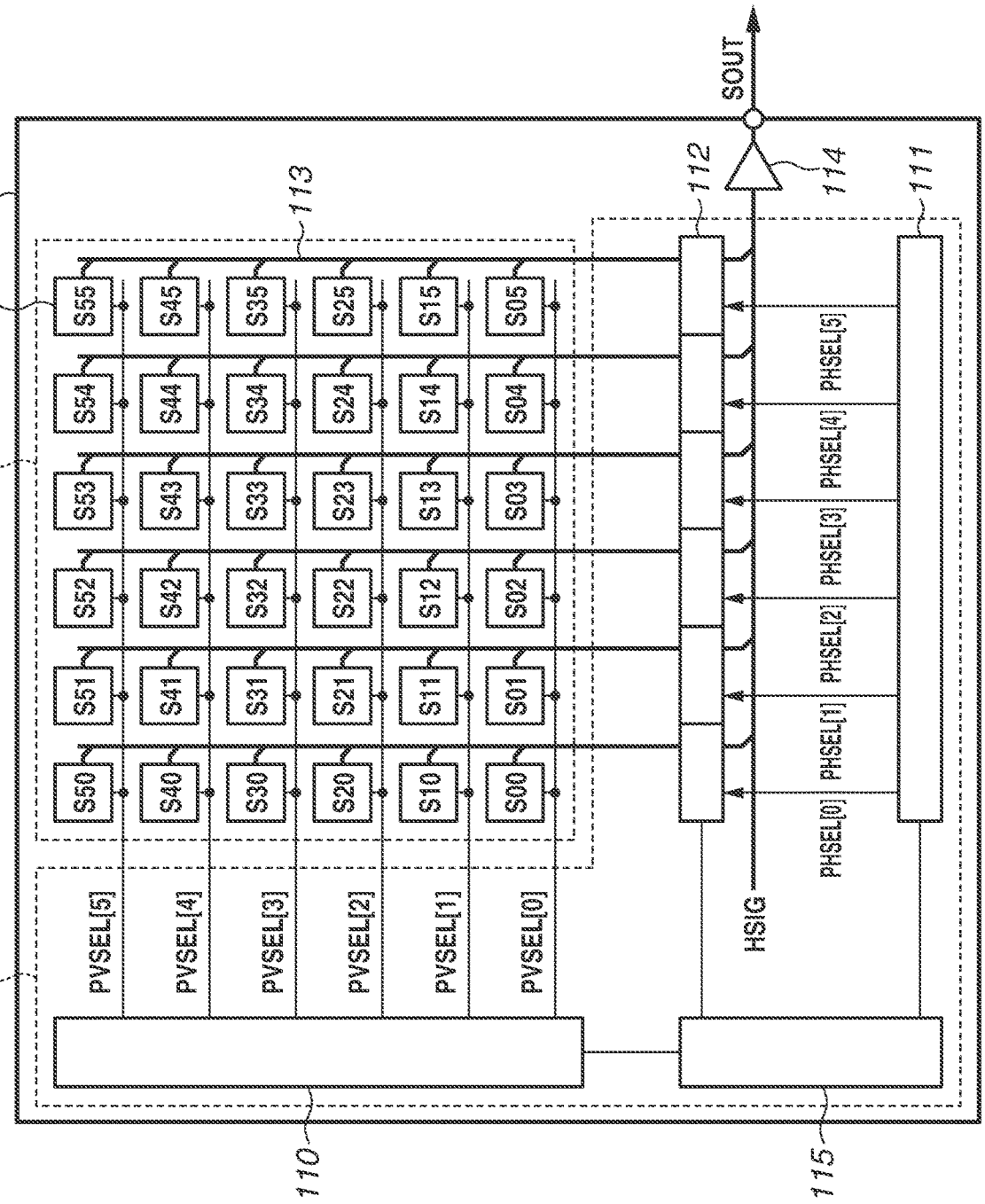
FIG. 3 is a diagram illustrating a configuration example of a circuit chip according to the exemplary embodiment.

FIG. 3 is a diagram illustrating a configuration example of the circuit chip 21. As illustrated in FIG. 3, the circuit chip 21 includes the pixel circuit area 22 and the reading circuit area 23. The pixel circuit area 22 includes a plurality of signal processing units 103 two-dimensionally arranged in the row direction and the column direction. FIG. 3 illustrates 36 signal processing units 103 that are arranged in six rows from a 0-th row to a fifth row and six columns from a 0-th column to a fifth column, with reference numerals indicating the row number and the column number. For example, the signal processing unit 103 arranged in a first row and a fourth column is denoted by a reference numeral "S14". The number of rows and the number of columns of the signal processing units 103 arranged in the pixel circuit area 22 are not particularly limited.

The reading circuit area 23 includes a vertical scanning circuit 110, a horizontal scanning circuit 111, column circuits 112, a control signal output circuit 114, and a control pulse generation unit 115.

Control signal lines 214 (See FIGS. 4A and 4B) extending in a first direction (lateral direction in FIG. 3) are arranged in the respective rows of the pixel circuit area 22. Each of the control signal lines 214 are connected to the signal processing units 103 arranged in the first direction in the corresponding row. The first direction in which the control signal lines 214 extend is referred to as the row direction or a horizontal direction in some cases.

The control signal lines 214 in the respective rows are connected to the vertical scanning circuit 110. The vertical scanning circuit 110 supplies control signals PVSEL to drive the signal processing units 103, to the signal processing units 103 through the control signal lines 214. FIG. 3 illustrates the control signals PVSEL supplied to the signal processing units 103 in the rows through the control signal lines 214, with the row number. For example, the control signal in the control signal line 214 in the first row is dented by a reference symbol "PVSEL[1]".

Column signal lines 113 extending in a second direction (vertical direction in FIG. 3) intersecting with the first direction are arranged in the respective columns of the pixel circuit area 22. Each of the column signal lines 113 is connected to the signal processing units 103 arranged in the second direction in the corresponding column, thereby serving as a common signal line. The second direction in which the column signal lines 113 extend is referred to as the column direction or the vertical direction in some cases. Although not illustrated, n column signal lines 113 are arranged to output n-bit digital signals.

The column signal lines 113 in the columns are connected to the respective corresponding column circuits 112. The column circuits 112 are provided to correspond to the respective columns of the pixel circuit area 22. The column circuits 112 each have a function to store pixel signals read out from the signal processing units 103 through the corresponding column signal line 113.

The horizontal scanning circuit 111 supplies control signals PHSEL to read out signals from the column circuits 112 in the columns, to the column circuits 112 through control signal lines. The column circuits 112 in the columns that has received the control signals PHSEL from the horizontal scanning circuit 111 output the stored pixel signals to the control signal output circuit 114 through horizontal output lines (not illustrated).

FIG. 3 illustrates the control signals PHSEL supplied to the column circuits 112 in the columns through the control signal lines, with the column number. For example, the control signal in the control signal line in the fourth column is denoted by a reference symbol "PHSEL[4]". Although not illustrated, n horizontal output lines are arranged to output n-bit digital signals.

The control signal output circuit 114 outputs a digital signal corresponding to the pixel signal as an output signal SOUT of the photoelectric conversion device.

The control pulse generation unit 115 supplies control signals to control operations and timings of the respective operations of the vertical scanning circuit 110, the horizontal scanning circuit 111, and the column circuits 112. At least a part of the control signals to control the operations and the timings of the respective operations of the vertical scanning circuit 110, the horizontal scanning circuit 111, and the column circuits 112 can be supplied from an outside of the photoelectric conversion device.

Figure 4A:
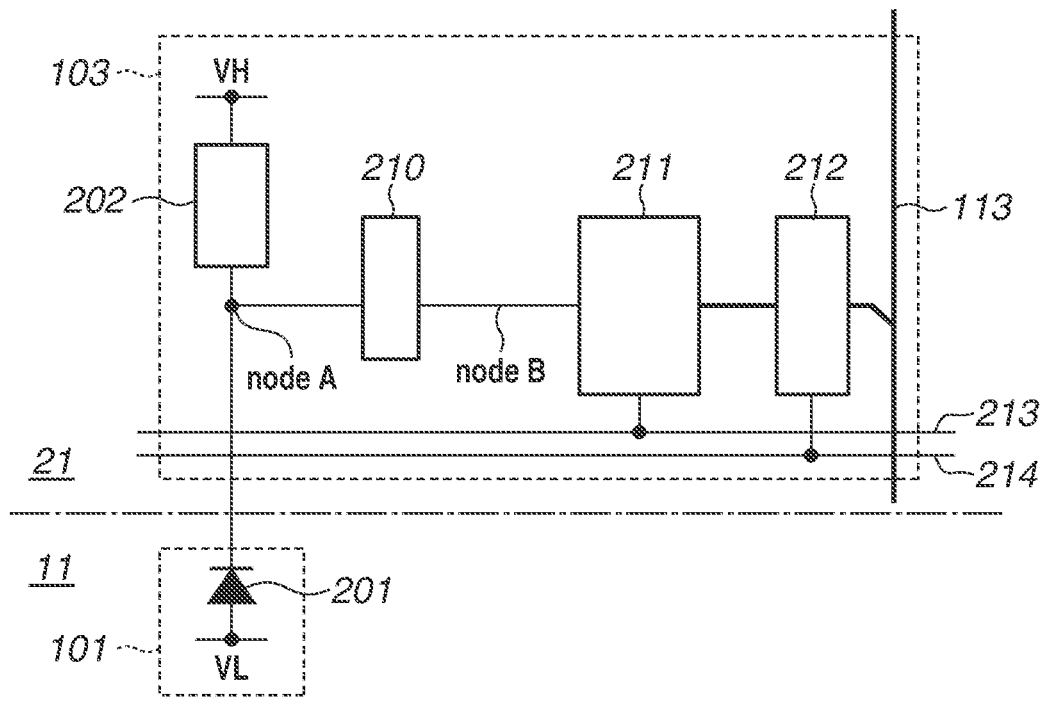
FIGS. 4A and 4B are equivalent circuits and block diagrams of a pixel and a signal processing unit according to the exemplary embodiment.
Figure 4B:
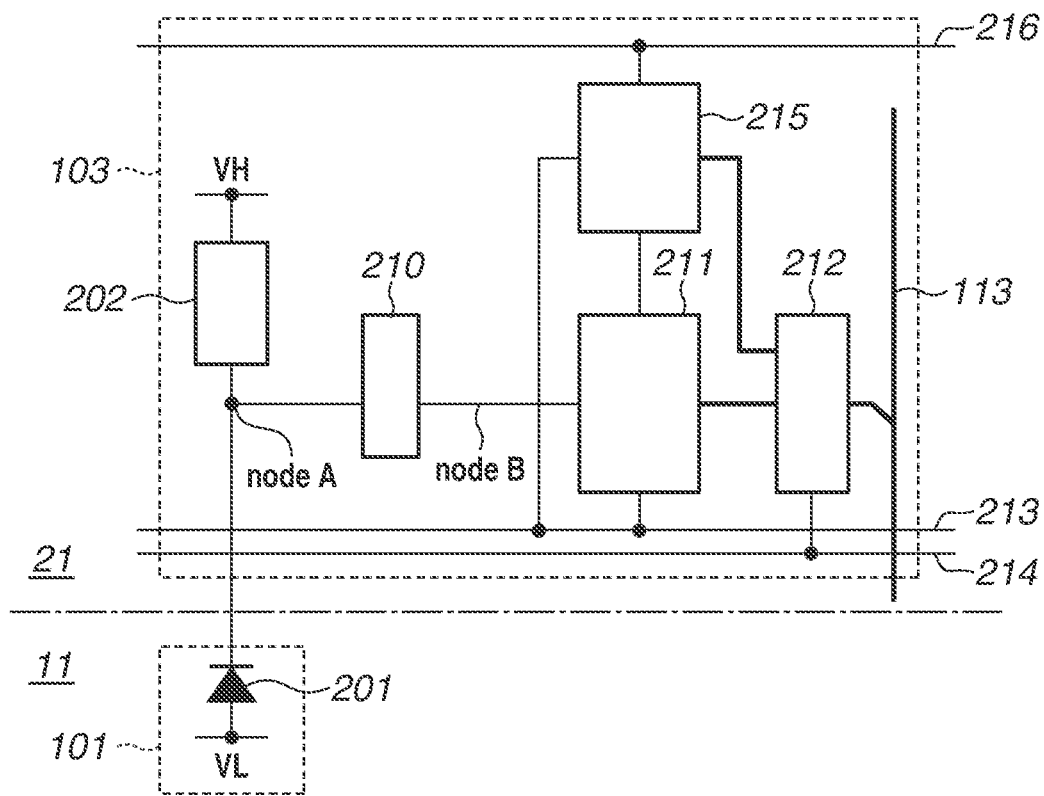

FIGS. 4A and 4B each illustrate an example of an equivalent circuit of a pixel and a block diagram of one of the pixels 101 in the sensor chip 11 in FIG. 2 and a corresponding one of the signal processing units 103 in the circuit chip 21 in FIG. 3.

In FIG. 4A, the pixel 101 includes an APD 201 as a photoelectric conversion unit. When light enters the APD 201, charges corresponding to the incident light are generated by photoelectric conversion. A voltage VL (first voltage) is applied to an anode of the APD 201, and a voltage VH (second voltage), which is higher than the voltage VL supplied to the anode, is supplied to a cathode of the APD 201. In other words, reverse bias voltages to cause the APD 201 to perform avalanche multiplication are supplied to the anode and the cathode of the APD 201. When such voltages are supplied, the charges generated by the incident light cause the avalanche multiplication, and an avalanche current is generated.

In a case where the reversed bias voltages are supplied, the APD 201 operates in a Geiger mode in which a potential difference between the anode and the cathode is greater than a breakdown voltage, or in a linear mode in which the potential difference between the anode and the cathode is close to the breakdown voltage or less than or equal to the breakdown voltage. The APD operating in the Geiger mode is called a single-photon avalanche photodiode (SAPD). For example, the voltage VL (first voltage) is −30 V, and the voltage VH (second voltage) is 1 V.

The signal processing unit 103 in the circuit chip 21 includes a quench element 202, a waveform shaping unit 210, a counter circuit 211, and a selection circuit 212.

The quench element 202 is connected to a power supply, which supplies the voltage VH, and the APD 201. The quench element 202 has a function to replace change in the avalanche current generated in the APD 201, with a voltage signal. The quench element 202 functions as a load circuit (quench circuit) in signal multiplication by the avalanche multiplication, and suppress the voltage to be supplied to the APD 201 to suppress the avalanche multiplication (quench operation).

The waveform shaping unit 210 generates and outputs a pulse signal by shaping potential change in the cathode of the APD 201 obtained when a photon is detected. For example, an inverter circuit or a buffer circuit is used for the waveform shaping unit 210 serving as a pulse signal generation unit.

The counter circuit 211 counts the pulse signal output from the waveform shaping unit 210.

Further, the counter circuit 211 resets a count value in a case where a control signal PRES is supplied through a corresponding control signal line 213.

The selection circuit 212 switches electrical connection and electrical disconnection between the counter circuit 211 and the corresponding column signal line 113 by the control signal PVSEL supplied from the vertical scanning circuit 110 in FIG. 3 through the corresponding control signal line 214. The selection circuit 212 includes, for example, a buffer circuit to output a signal.

In FIG. 4B, a time to digital converter (TDC) circuit 215 and a control signal line 216 are added to the configuration illustrated in FIG. 4A. The TDC circuit 215 serving as a time measurement circuit operates based on a count result of the counter circuit 211, and measures a time by a time measurement clock supplied through the control signal line 216 until the control signal PRES is supplied through the control signal line 213.

The selection circuit 212 switches electrical connection and electrical disconnection between the counter circuit 211 or the TDC circuit 215 and the column signal line 113 by the control signal PVSEL, which is supplied from the vertical scanning circuit 110 in FIG. 3 through the control signal line 214.

Figure 5A:
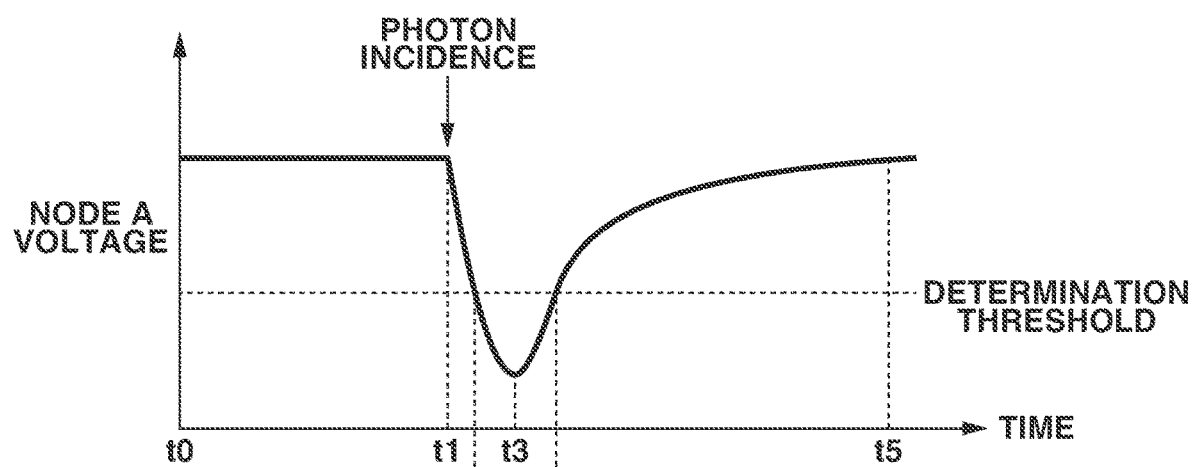
FIGS. 5A and 5B are timing charts each illustrating an operation of an avalanche photodiode (APD) and a waveform shaping unit according to the exemplary embodiment.
Figure 5B:
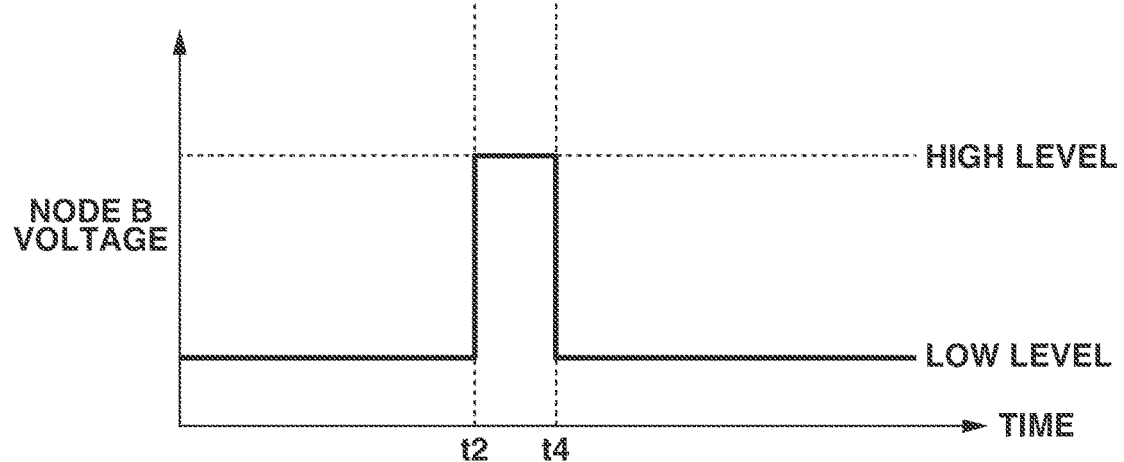

FIGS. 5A and 5B are timing charts to explain operations of the APD 201 and the waveform shaping unit 210 illustrated in FIGS. 4A and 4B. FIG. 5A illustrates a voltage change at a node A in FIGS. 4A and 4B, and FIG. 5B illustrates a voltage change at a node B in FIGS. 4A and 4B.

In a period from time t0 to time t1, a voltage VH–VL is applied to the APD 201. At this time, the voltage at the node B is at a low level.

At time t1, when a photon enters the APD 201, an avalanche multiplication current flows through the quench element 202, and the voltage at the node A drops.

At time t2, when the voltage at the node A becomes lower than a predetermined determination threshold, the voltage at the node B is changed from the low level to a high level by the function of the waveform shaping unit 210.

At time t3, when a voltage drop amount is further increased and the voltage applied to the APD 201 becomes small, the avalanche multiplication of the APD 201 stops, and the voltage at the node A does not drop more than a certain value. Thereafter, a current to supplement the voltage drop amount from the voltage VL flows through the node A, so that the voltage increases.

At time t4, when the voltage at the node A exceeds the predetermined determination threshold, the voltage at the node B is changed from the high level to the low level by the function of the waveform shaping unit 210.

At time t5, the voltage at the node A is statically settled to the original potential level.

Figure 6:
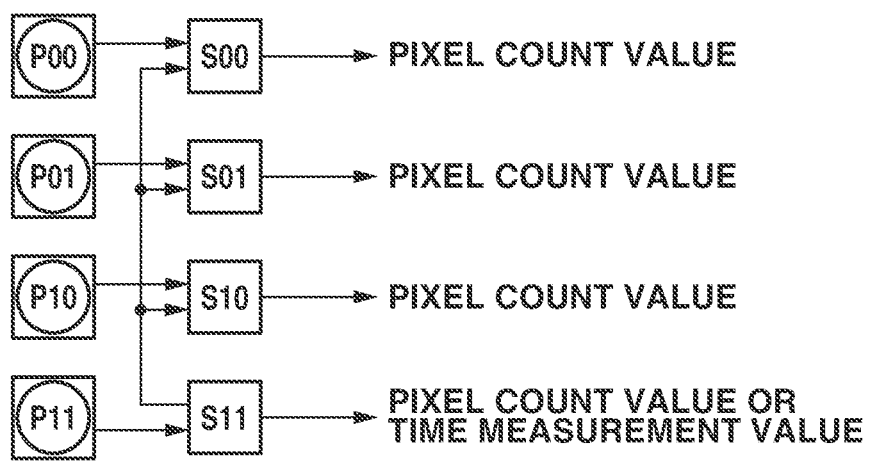
FIG. 6 is a block diagram in a case where a time to digital converter (TDC) circuit is connected to one of a plurality of pixels according to the exemplary embodiment.

FIG. 6 is a block diagram illustrating processing in a case where one of the plurality of pixels includes the TDC circuit 215.

FIG. 6 illustrates pixels P00, P01, P10, and P11 in the sensor chip 11 described with reference to FIG. 2 and signal processing units S00, S01, S10, and S11 in the circuit chip 21 described with reference to FIG. 3. Processing in a case where only the signal processing unit S11 connected to the pixel P11 among the four pixels includes the TDC circuit 215 is described.

The pixel P11 is a high-sensitivity pixel having the highest sensitivity among the four pixels. For example, a case in which each of the pixels P00, P01, and P10 is mounted with a color filter, whereas the high-sensitivity pixel P11 is not mounted with the color filter is assumed. Alternatively, a case where a pixel size of the high-sensitivity pixel P11 is greater than a pixel size of each of the other pixels is assumed. The high-sensitivity pixel P11 is higher in sensitivity than the other pixels. Thus, in a case where light having the same light quantity enters each of the pixels, a count value of the counter circuit for the high-sensitivity pixel P11 first reaches a full count value. The signal processing unit S11 selectively outputs one of the count value by the counter circuit 211 and a time measurement value by the TDC circuit 215 based on the count result of the counter circuit 211.

Figure 7:
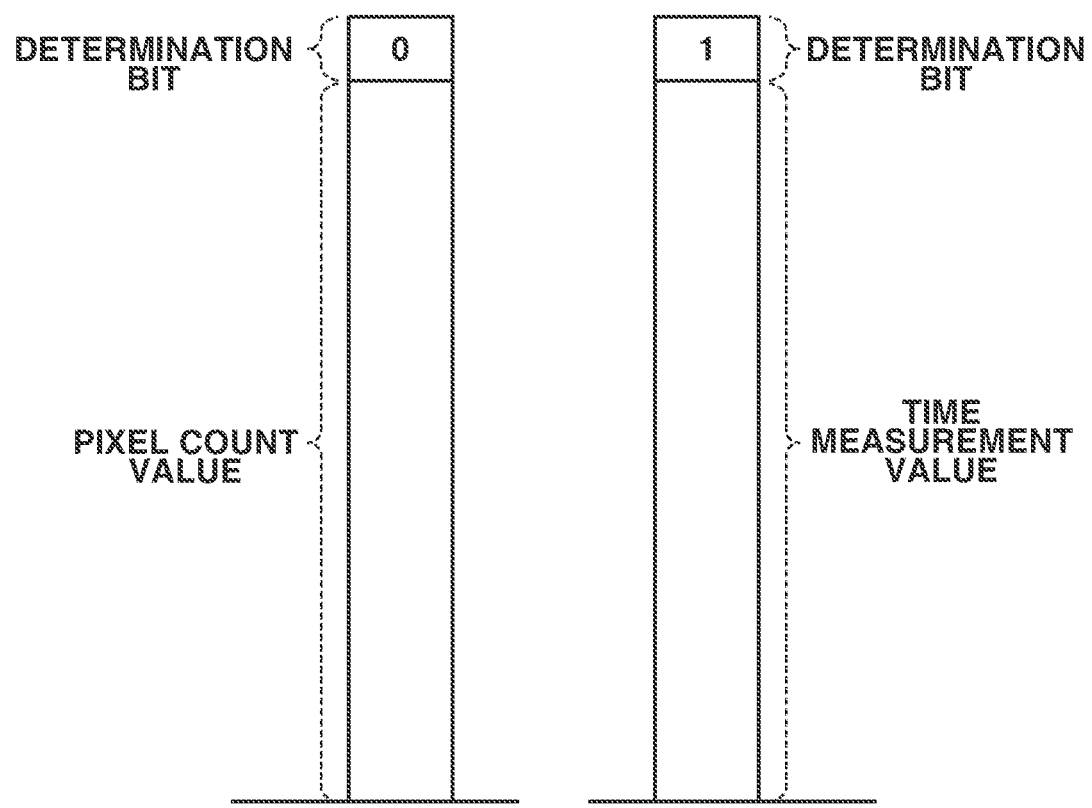
FIG. 7 is a conceptual diagram illustrating a pixel output result according to the exemplary embodiment.

FIG. 7 is a conceptual diagram of output data from the signal processing unit S11. In this example, the most significant bit of the output data is a determination bit. For example, when the determination bit is zero, subsequent data is processed as a pixel count value in a subsequent stage. When the determination bit is one, the subsequent data is processed as the time measurement value in the subsequent stage. In such a manner, providing the determination bit makes it possible to eliminate necessity of simultaneous output of the pixel count value and the time measurement value, thereby making it possible to reduce the output data amount.

Control according to the present exemplary embodiment is described with reference to flowcharts in FIG. 8 and FIG. 9.

Figure 8:
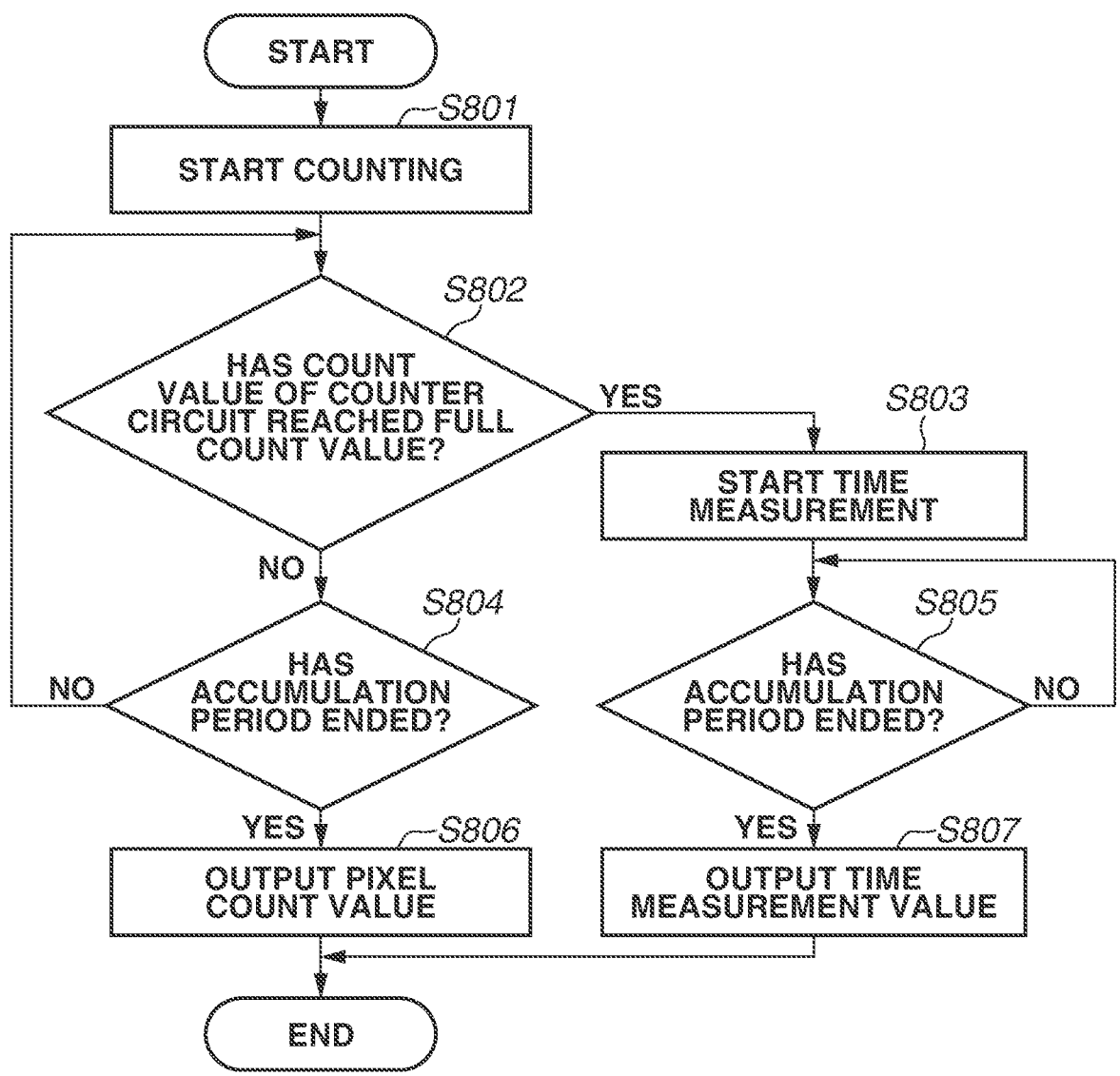
FIG. 8 is a flowchart of control according to the exemplary embodiment.

FIG. 8 is a flowchart in a case where data is output from the signal processing unit S11 including the TDC circuit 215 in the block diagram illustrated in FIG. 6.

In step S801, reset of the counter circuit 211 by the control signal PRES is canceled, and counting of the pulse signal output from the waveform shaping unit 210 starts.

In step S802, it is checked whether a count value of the counter circuit 211 has reached a full count value. In a case where the count value has not reached the full count value (NO in step S802), the processing proceeds to step S804.

In step S804, it is checked whether an accumulation period has ended. The accumulation period used herein indicates a time period after the reset of the counter circuit 211 by the control signal PRES is canceled until the control signal PVSEL is supplied. In a case where the accumulation period has not ended (NO in step S804), the processing returns to step S802. In a case where the accumulation period has ended (YES in step S804), the processing proceeds to step S806.

In step S806, the count value of the counter circuit 211 at that time is output as a pixel value.

In a case where the count value of the counter circuit 211 has reached the full count value in step S802 (YES in step S802), the processing proceeds to step S803.

In step S803, time measurement by the TDC circuit 215 starts at the same time when the count value of the counter circuit 211 reaches the full count value.

In step S805, it is checked whether the accumulation period has ended. In a case where the accumulation period has not ended (NO in step S805), the time measurement by the TDC circuit 215 is performed until the accumulation period ends.

In a case where the accumulation period has ended in step S805 (YES in step S805), the processing proceeds to step S807.

In step S807, the time measurement value by the TDC circuit 215 at the time when the accumulation period ends is output as the pixel value.

Figure 9:
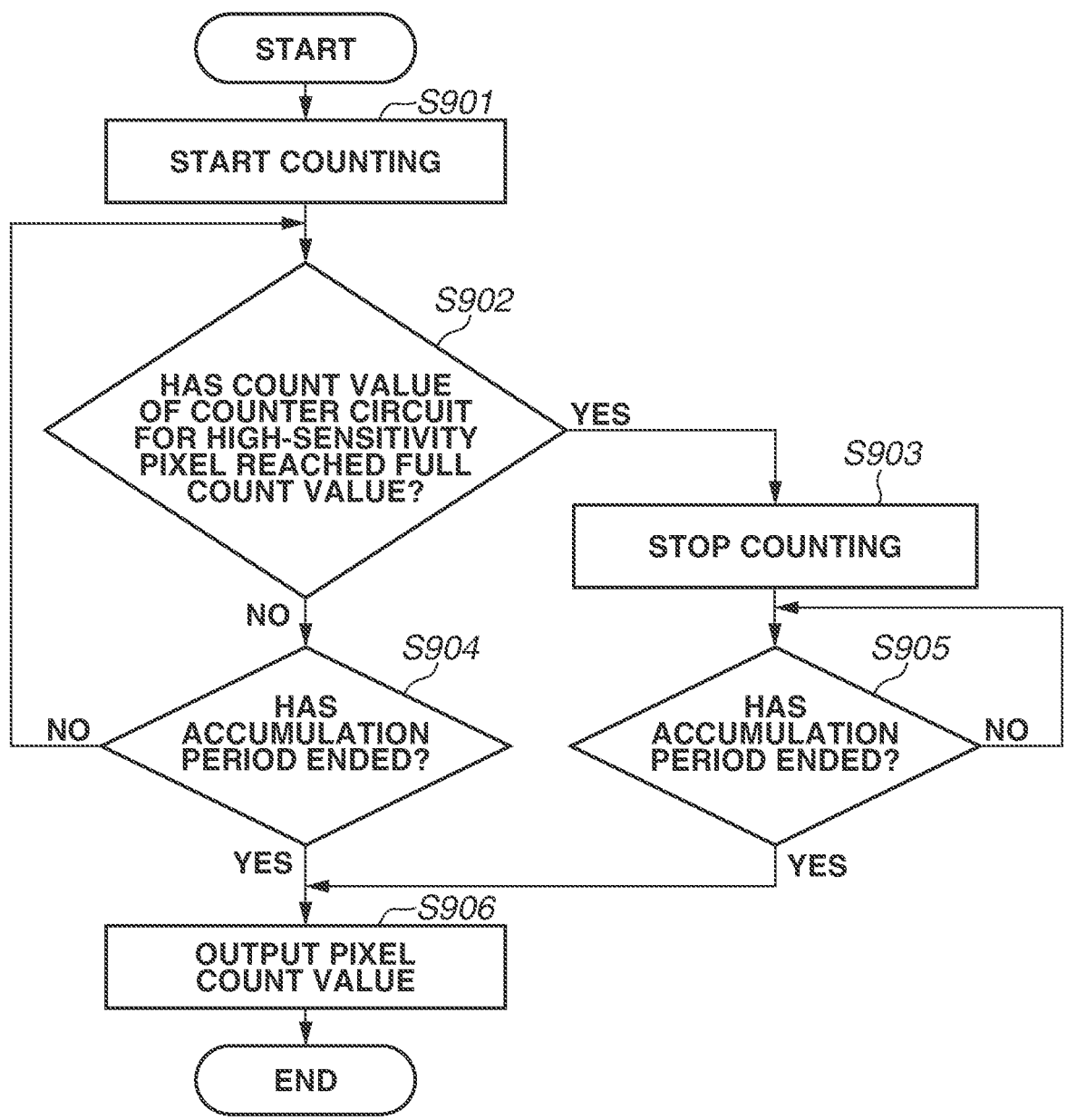
FIG. 9 is a flowchart of the control according to the exemplary embodiment.

FIG. 9 is a flowchart in a case where data is output from the signal processing units S00, S01, and S10 each not including the TDC circuit 215 in the block diagram illustrated in FIG. 6.

In step S901, reset of the counter circuit 211 by the control signal PRES is canceled, and counting of the pulse signal output from the waveform shaping unit 210 starts.

In step S902, it is checked whether the count value of the counter circuit 211 of the signal processing unit S11 that is connected to the high-sensitivity pixel circuit P11 and includes the TDC circuit 215 has reached the full count value. In a case where the count value has not reached the full count value (NO in step S902), the processing proceeds to step S904.

In step S904, it is checked whether the accumulation period has ended. In a case where the accumulation period has ended while the count value of the counter circuit 211 of the signal processing unit S11 connected to the high-sensitivity pixel P11 does not reach the full count value (YES in step S904), the processing proceeds to step S906.

In step S906, count values of the counter circuits 211 of the respective signal processing units S00, S01, and S10 at the time when the accumulation period ends are output as pixel values.

In a case where the count value of the counter circuit 211 of the signal processing unit S11 connected to the high-sensitivity pixel P11 has reached the full count value in step S902 (YES in step S902), the processing proceeds to step S903.

In step S903, the counter circuits 211 of the signal processing units S00, S01, and S10 stop at the same time when the count value of the counter circuit 211 of the signal processing unit S11 connected to the high-sensitivity pixel P11 reaches the full count value. The processing then proceeds to step S905.

In step S905, it is checked whether the accumulation period has ended. In a case where the accumulation period has ended (YES in step S905), the processing proceeds to step S906.

In step S906, the count values at the time when the counter circuits 211 of the signal processing units S00, S01, and S10 are stopped are output as pixel values.

In a case where the count value of the counter circuit 211 of the signal processing unit S11 connected to the high-sensitivity pixel P11 has reached the full count value, a method of restoring pixel values of the respective pixels from the time measurement value of the TDC circuit 215 is described.

Even when the counter circuits 211 of the signal processing units S00, S01, and S10 that are respectively connected to normal pixels P00, P01, and P10 and each do not include the TDC circuit 215 stop on the way, the time measurement value of the signal processing unit S11 that is connected to the high-sensitivity pixel P11 and includes the TDC circuit 215 is used.

This makes it possible to estimate and restore the count values, until the end of the accumulation period, of the counter circuits 211 of the signal processing units S00, S01, and S10 each not including the TDC circuit 215.

Figure 10:
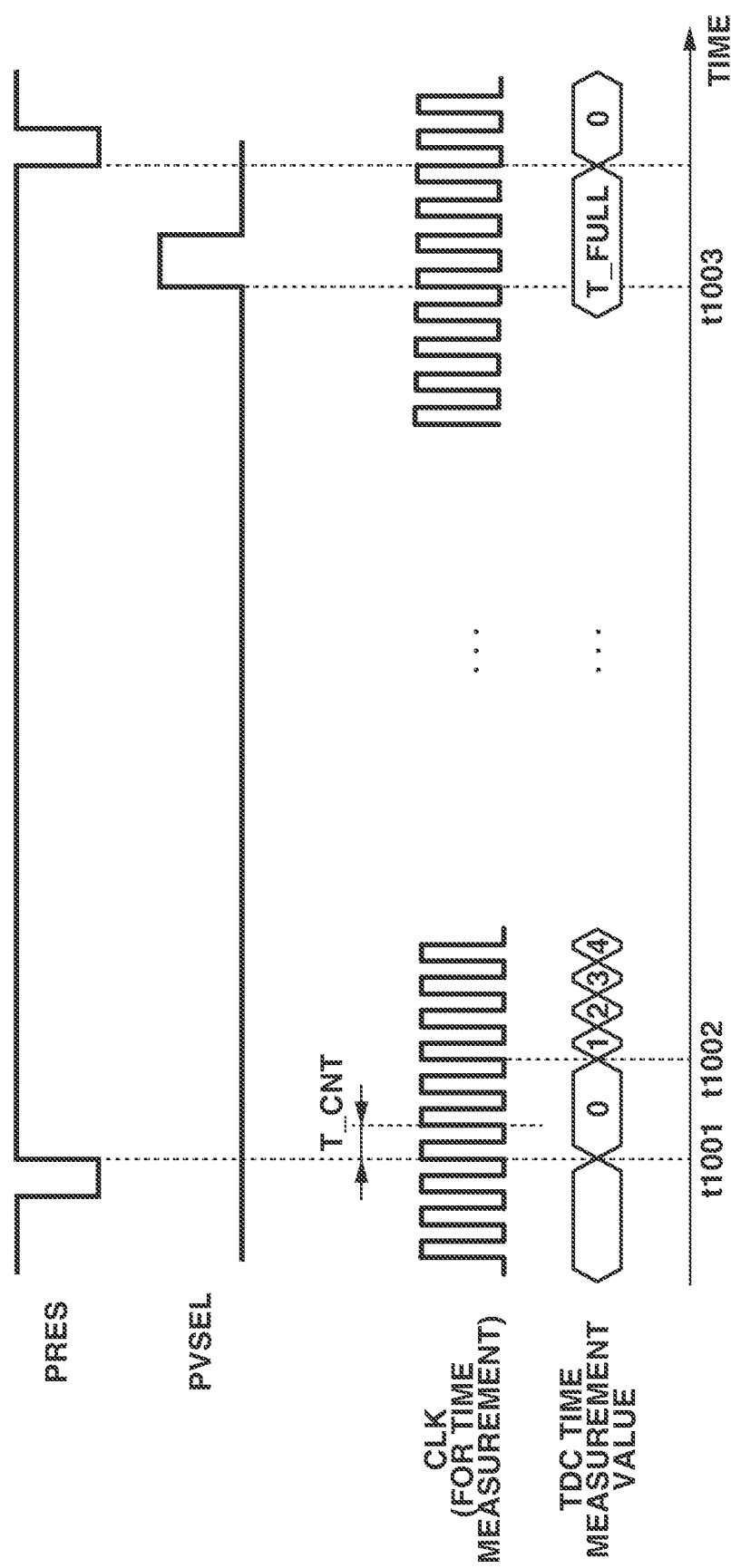
FIG. 10 is a timing chart according to the exemplary embodiment.

FIG. 10 is a timing chart of the control signal PRES, the control signal PVSEL, a clock signal CLK for time measurement by the TDC circuit 215, and the time measurement value by the TDC circuit 215 in the configuration illustrated in FIG. 6.

At time t1001, reset of the counter circuit 211 by the control signal PRES is canceled. During the accumulation period until the control signal PVSEL is supplied at time t1003, the counter circuit 211 of the signal processing unit S11 that is connected to the high-sensitivity pixel P11 and includes the TDC circuit 215 counts the pulse signal output from the waveform shaping unit 210.

At time t1002, when the count value of the counter circuit 211 reaches the full count value, time measurement by the TDC circuit 215 starts. The TDC circuit 215 measures a time until the accumulation period ends, in synchronization with the clock signal CLK for time measurement.

In the present exemplary embodiment, the example in which the TDC circuit 215 measures the time after the count value of the counter circuit 211 of the signal processing unit S11 connected to the high-sensitivity pixel P11 reaches the full count value until the accumulation period ends is described. Alternatively, the TDC circuit 215 can measure a time after start of the accumulation period until the count value of the counter circuit 211 reaches the full count value.

A method of restoring the pixel value in the configuration illustrated in FIG. 6 is described. A pixel value C_RES of the high-sensitivity pixel P11 can be restored by the following equation, $$C\_RES=C\_MAX \times TDC\_FULL/(TDC\_FULL-T\_FULL).$$

In the equation, C_MAX is a maximum count value of the counter circuit 211 of the signal processing unit S11 connected to the high-sensitivity pixel P11, and TDC_FULL is a maximum measurable time that is measurable by the TDC circuit 215 during the accumulation period. In addition, T_FULL is a time measurement value after the count value of the counter circuit 211 of the signal processing unit S11 connected to the high-sensitivity pixel P11 reaches the full count value until the end of the accumulation period.

When a clock period of the TDC circuit 215 is denoted by T_CNT and the accumulation period is denoted by T_ACC, the maximum measurable time TDC_FULL that is measurable by the TDC circuit 215 is defined by the following equation, $$TDC\_FULL=T\_ACC/T\_CNT.$$

The maximum count value C_MAX, the accumulation period T_ACC, and the clock period T_CNT in the above-described equations are uniquely determined. Thus, the maximum measurable time TDC_FULL is known, and the pixel value can be restored from the time measurement value T_FULL.

The time until the count value of the counter circuit for the high-sensitivity pixel P11 reaches the full count value influences on resolution of the pixel value to be restored in some cases. For example, when the accumulation period T_ACC is 16.6 [ms], and the clock period T_CNT is 1.7 [µs], the maximum measurable time TDC_FULL is 9803. At this time, in a case where the maximum count value C_MAX is 256, and the time measurement values T_FULL are 8000 and 8001, the restored pixel values are 1392 [LSB] and 1391 [LSB] that have a difference of 1 [LSB].

On the other hand, in a case where the time measurement values T_FULL are 9803 and 9802, the restored pixel values are 2723404 [LSB] and 1306122 [LSB]. The count difference until the count value reaches the full count value is one count in each of the former case and the latter case, but the restored pixel values are largely different between the former case and the latter case. In other words, the resolution of the restored pixel value is rough when the time after the start of the accumulation period until the count value reaches the full count value is shorter. It is concerned that the resolution of a high luminance portion near a saturation portion in the output image is deteriorated.

Figure 11:
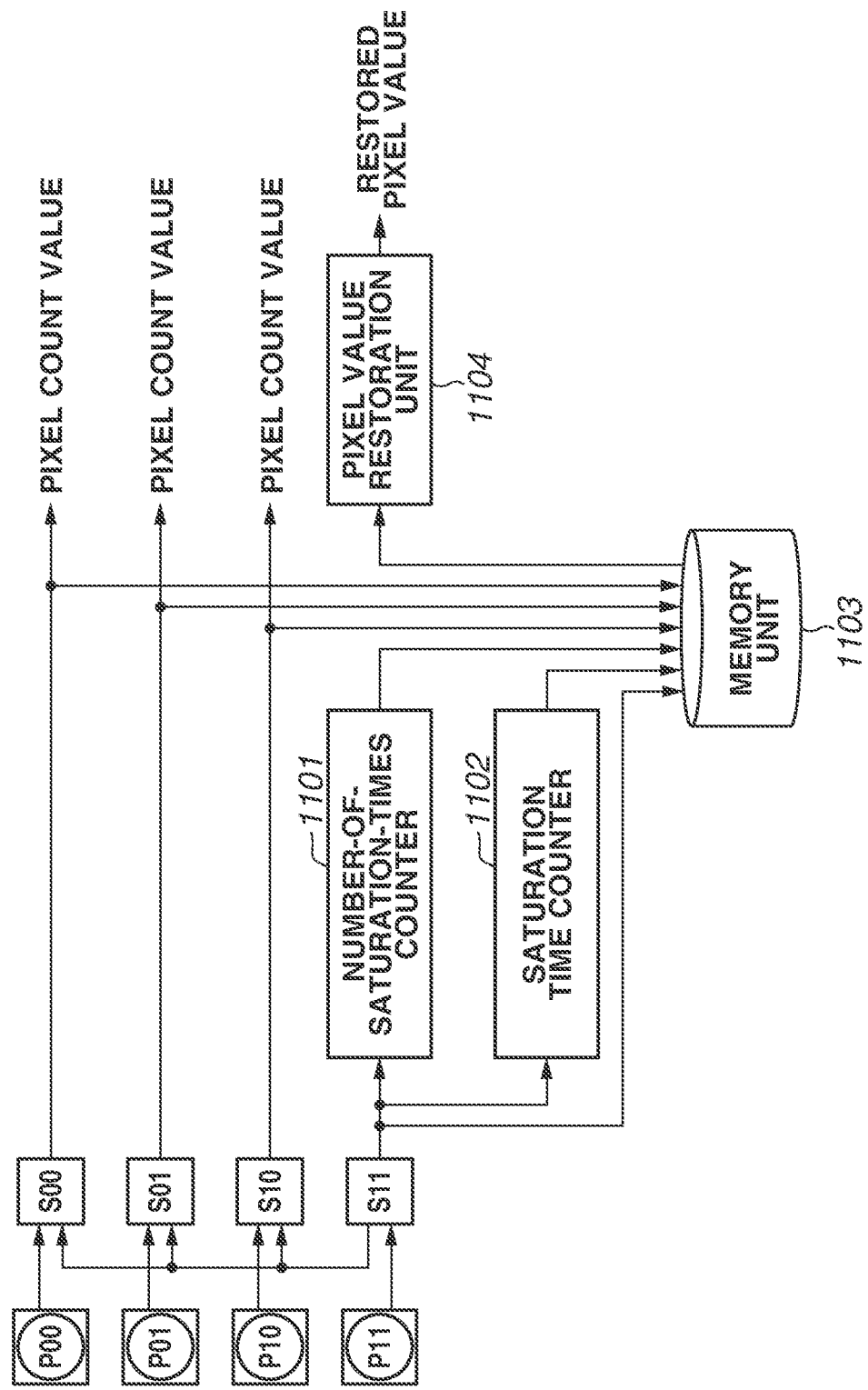
FIG. 11 is a block diagram according to the exemplary embodiment.

FIG. 11 is a block diagram illustrating a configuration that further includes a number-of-saturation-times counter 1101, a saturation time counter 1102, a memory unit 1103, and a pixel value restoration unit 1104 in addition to the configuration in FIG. 6.

The number-of-saturation-times counter 1101 counts the number of times when the count value of the counter circuit 211 of the signal processing unit S11 connected to the high-sensitivity pixel P11 reaches the full count value during the accumulation period. The saturation time counter 1102 counts a total saturation time of the counter circuit 211 of the signal processing unit S11 connected to the high-sensitivity pixel P11 during the accumulation period, based on the time measurement value measured by the TDC circuit 215. The memory unit 1103 stores the count values of the signal processing units S00, S01, S10, and S11 and output results of the number-of-saturation-times counter 1101 and the saturation time counter 1102.

Control in the configuration in FIG. 11 is described with reference to flowcharts in FIG. 12 and FIG. 13.

Figure 12:
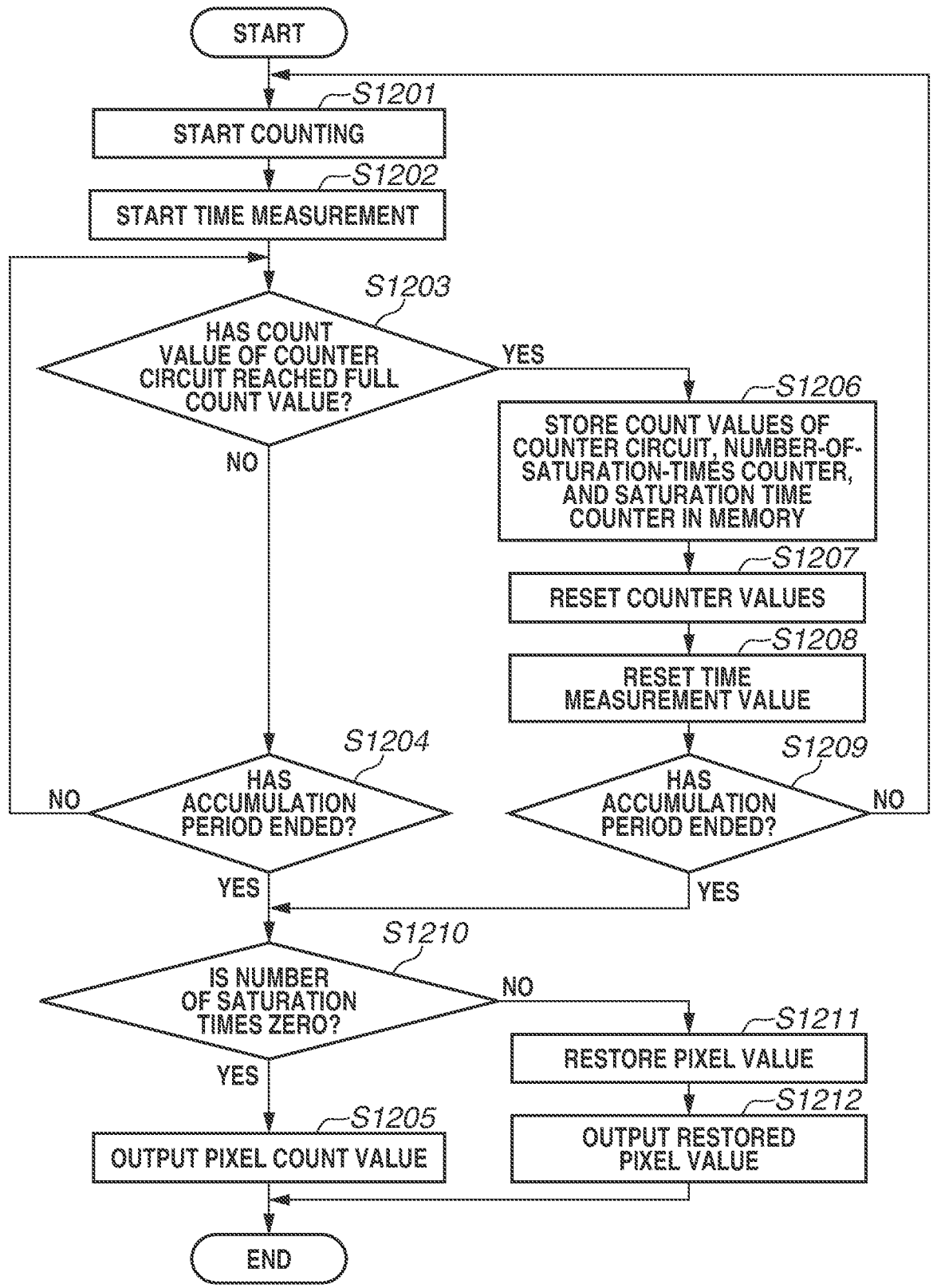
FIG. 12 is a flowchart of the control according to the exemplary embodiment.

FIG. 12 is a flowchart in a case where data is output from the signal processing unit S11 including the TDC circuit 215 in the block diagram illustrated in FIG. 11.

In step S1201, reset of the counter circuit 211 by the control signal PRES is canceled, and counting of the pulse signal output from the waveform shaping unit 210 starts.

In step S1202, time measurement by the TDC circuit 215 starts at the same time as step S1201.

In step S1203, it is checked whether a count value of the counter circuit 211 has reached a full count value. In a case where the count value has not reached the full count value (NO in step S1203), the processing proceeds to step S1204.

In step S1204, it is checked whether an accumulation period has ended. The accumulation period used herein indicates a time period after the reset of the counter circuit 211 by the control signal PRES is canceled until the control signal PVSEL is supplied. In a case where the accumulation period has not ended (NO in step S1204), the processing returns to step S1203.

In a case where the count value of the counter circuit 211 has reached the full count value in step S1203 (YES in step S1203), the processing proceeds to step S1206.

In step S1206, the count values of the counter circuit 211, the number-of-saturation-times counter 1101, and the saturation time counter 1102 are stored in the memory unit 1103. The processing then proceeds to step S1207.

In step S1207, the count values of the counter circuit 211 and the saturation time counter 1102 are reset.

In step S1208, the time measurement value of the TDC circuit 215 is reset. The processing then proceeds to step S1209.

In step S1209, it is checked whether the accumulation period has ended. In a case where the accumulation period has not ended (NO in step S1209), the processing returns to step S1201. In other words, even when the count value of the counter circuit 211 reaches the full count value during the accumulation period, counting is performed again until the accumulation period ends.

In a case where the accumulation period has ended in step S1204 or S1209 (YES in step S1204 or S1209), the processing proceeds to step S1210.

In step S1210, it is checked whether the count value of the counter circuit 211 has reached the full count value during the accumulation period. In a case where the count value of the counter circuit 211 has not reached the full count value during the accumulation period (in case where the count value of the number-of-saturation-times counter 1101 is zero, YES in step S1210), the processing proceeds to step S1205.

In step S1205, the count value of the counter circuit 211 is output as a pixel value.

In a case where the count value of the counter circuit 211 has reached the full count value during the accumulation period in step S1210 (NO in step S1210), the processing proceeds to step S1211.

In step S1211, the pixel value is restored using the values stored in the memory unit 1103 in step S1206. The processing then proceeds to step S1212.

In step S1212, the restored pixel value is output.

Figure 13:
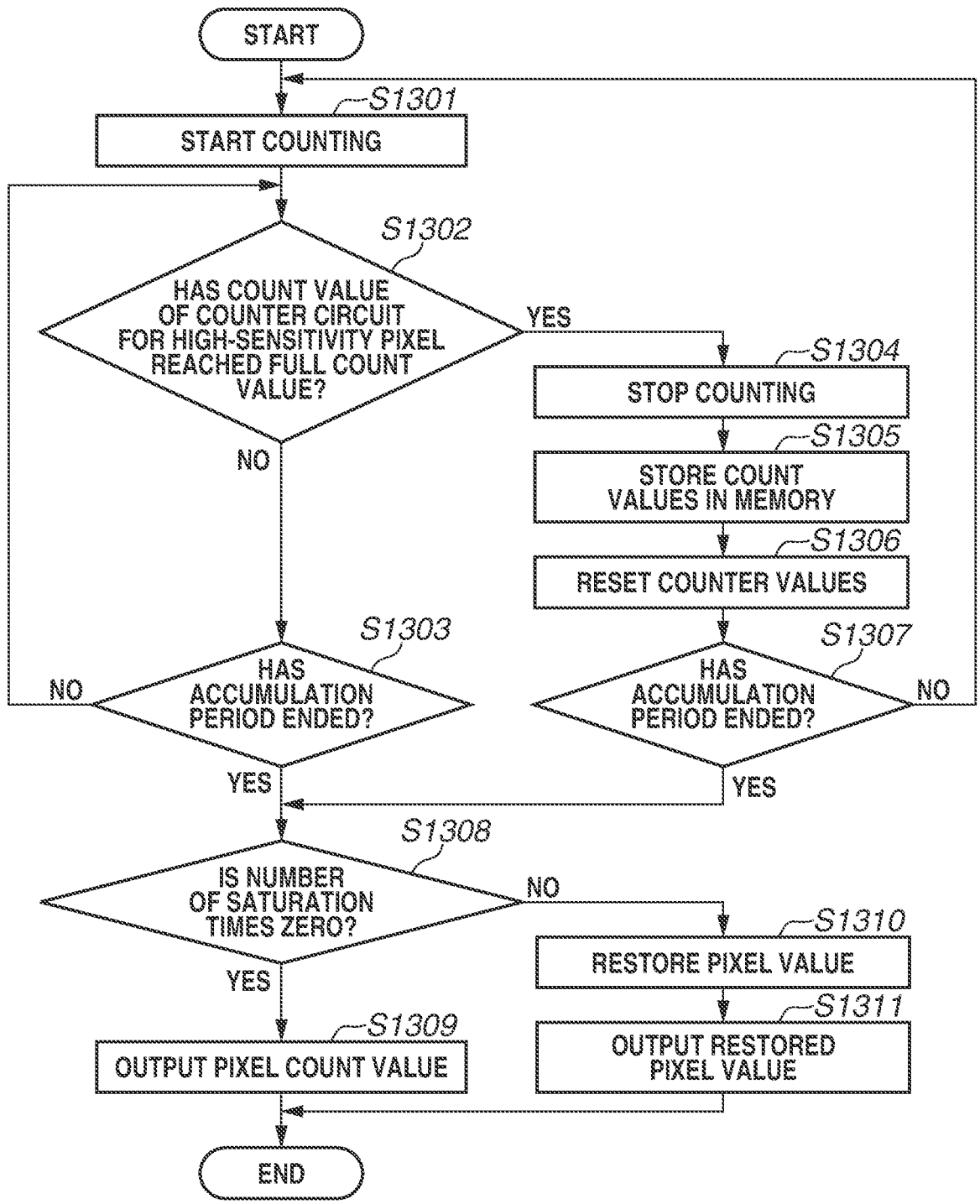
FIG. 13 is a flowchart of the control according to the exemplary embodiment.

FIG. 13 is a flowchart in a case where data is output from the signal processing units S00, S01, and S10 each not including the TDC circuit 215 in the block diagram illustrated in FIG. 11.

In step S1301, reset of the counter circuit 211 by the control signal PRES is canceled, and counting of the pulse signal output from the waveform shaping unit 210 starts.

In step S1302, it is checked whether a count value of the counter circuit 211 of the signal processing unit S11 including the TDC circuit 215 has reached the full count value. In a case where the count value has not reached the full count value (NO in step S1302), the processing proceeds to step S1303.

In step S1303, it is checked whether an accumulation period has ended. The accumulation period used herein indicates a time period after the reset of the counter circuit 211 by the control signal PRES is canceled until the control signal PVSEL is supplied. In a case where the accumulation period has not ended (NO in step S1303), the processing returns to step S1302.

In a case where the count value of the counter circuit 211 of the signal processing unit S11 has reached the full count value in step S1302 (YES in step S1302), the processing proceeds to step S1304.

In step S1304, the counter circuits 211 of the signal processing units S00, S01, and S10 stop at the same time when the count value of the counter circuit 211 of the signal processing unit S11 reaches the full count value. The processing then proceeds to step S1305.

In step S1305, the count values of the counter circuits 211 of the signal processing units S00, S01, and S10 at that time are stored in the memory unit 1103. The processing then proceeds to step S1306.

In step S1306, the count values of the counter circuits 211 of the signal processing units S00, S01, and S10 are reset. The processing then proceeds to step S1307.

In step S1307, it is checked whether the accumulation period has ended. In a case where the accumulation period has not ended (NO in step S1307), the processing returns to step S1301.

In a case where the accumulation period has ended in step S1303 or S1307 (YES in step S1303 or S1307), the processing proceeds to step S1308.

In step S1308, it is checked whether the count value of the counter circuit 211 of the signal processing unit S11 has reached the full count value during the accumulation period. In a case where the count value of the counter circuit 211 of the signal processing circuit S11 has not reached the full count value during the accumulation period (in case where the count value of the number-of-saturation-times counter 1101 is zero, YES in step S1308), the processing proceeds to step S1309.

In step S1309, the count values of the counter circuits 211 of the signal processing units S00, S01, and S10 stored in the memory unit 1103 are output as pixel values.

In a case where the count value of the counter circuit 211 of the sign processing unit S11 has reached the full count value during the accumulation period in step S1308 (NO in step S1308), the processing proceeds to step S1310.

In step S1310, the pixel value is restored using the values stored in the memory unit 1103. The processing then proceeds to step S1311.

In step S1311, the restored pixel value is output.

The counter circuit 211 is reset at a timing when the accumulation period starts or ends. Thus, in next accumulation period, the counter circuit 211 starts counting from a reset state.

FIG. 14 is a timing chart of the control signal PRES, the control signal PVSEL, the clock signal CLK for time measurement by the TDC circuit 215, the time measurement value by the TDC circuit 215, and the number of saturation times and the total saturation time stored in the memory unit 1103, in the configuration in FIG. 11.

At time t1401, reset of the counter circuit 211 by the control signal PRES is canceled. During the accumulation period until the control signal PVSEL is supplied at time t1405, the counter circuit 211 of the signal processing unit S11 that is connected to the high-sensitivity pixel P11 and includes the TDC circuit 215 counts the pulse signal output from the waveform shaping unit 210. At the same time, the TDC circuit 215 measures the time until the count value of the counter circuit 211 of the signal processing unit S11 reaches the full count value to be saturated.

At time t1402, when the count value of the counter circuit 211 of the signal processing unit S11 reaches the full count value to be saturated, the saturation time counter 1102 counts, as the total saturation time, the time measured by the TDC circuit 215, and stores the total saturation time in the memory 1103. The time measurement value by the TDC circuit 215 at this time is three, so that the total saturation time is three.

Further, the number-of-saturation-times counter 1101 counts the number of saturation times when the count value of the counter circuit 211 is saturated during the accumulation period, and stores the number of saturation times in the memory unit 1103. The number of saturation times at this time is one. After the values are stored in the memory unit 1103, the counter circuit 211 and the TDC circuit 215 are reset, and counting restarts.

At time t1403, when the count value of the counter circuit 211 of the signal processing unit S11 reaches the full count value to be saturated again, the number of saturation times and the total saturation time at that time are stored in the memory unit 1103. The number of saturation times at time t1403 is two.

Further, the time measurement value until the count value of the counter circuit 211 of the signal processing unit S11 reaches the full count value during a period from time t1402 to time t1403 is four. In this case, the total saturation time at time t1403 is seven that is sum of the saturation time during the period from time t1401 to time t1402 and the saturation time during the period from time t1402 to time t1403. In a manner similar to the above, counting restarts after the counter circuit 211 and the TDC circuit 215 are reset.

At time t1404, when the count value of the counter circuit 211 of the signal processing unit S11 reaches the full count value to be saturated again, the number of saturation times and the total saturation time at that time are stored in the memory unit 1103. The number of saturation times at time t1404 is three.

Further, when the time measurement value until the count value of the counter circuit 211 of the signal processing unit S11 reaches the full count value during a period from time t1403 to time t1404 is three, the total saturation time at time t1404 is ten that is sum of the saturation time stored in the memory unit 1103 and the saturation time during the period from time t1403 to time t1404.

The above-described processing is repeated until the accumulation period ends at time t1405. In a case where the accumulation period ends at time t1405 and the count value of the counter circuit 211 of the signal processing unit S11 has reached the full count value during the accumulation period, the pixel value is restored from information stored in the memory unit 1103.

A method of restoring the pixel value in the configuration in FIG. 11 is described.

Restoration of the pixel value of the high-sensitivity pixel P11 is described. The pixel value C_RES of the high-sensitivity pixel P11 can be restored by the following equation, $$C\_RES = C\_MAX \times TDC\_FULL / (T\_SAT/NUM\_SAT).$$

In the equation, C_RES is the pixel value of the high-sensitivity pixel P11 to be restored, and C_MAX is the maximum count value of the counter circuit 211 of the signal processing unit S11 connected to the high-sensitivity pixel P11.

Further, TDC_FULL is the maximum measurable time, which can be measured by the TDC circuit 215 during the accumulation period, NUM_SAT is the number of saturation times stored in the memory unit 1103, and T_SAT is the total saturation time.

In the above-described equation, T_SAT/NUM_SAT indicates an average value of the time until the count value of the counter circuit 211 of the signal processing unit S11 connected to the high-sensitivity pixel P11 reaches the full count value during the accumulation period.

Further, when the clock period of the TDC circuit 215 is denoted by T_CNT and the accumulation period is denoted by T_ACC, the maximum measurable time TDC_FULL, which can be measured by the TDC circuit 215, is defined by the following equation, $$TDC\_FULL = T\_ACC/T\_CNT.$$

The maximum count value C_MAX, the accumulation period T_ACC, and the clock period T_CNT are uniquely determined, respectively. Thus, the maximum measurable time TDC_FULL is known, and the pixel value can be restored from the number of saturation times NUM_SAT and the total saturation time T_SAT stored in the memory unit 1103.

At the end of the accumulation period, two pieces of information, namely, information indicating that the number of saturation times NUM_SAT is three and information indicating that the total saturation time T_SAT is 10 are stored in the memory unit 1103. Accordingly, the average value of the time until the count value of the counter circuit 211 of the signal processing unit S11 connected to the high-sensitivity pixel P11 reaches the full count value during the accumulation period is T_SAT/NUM_SAT=3.3.

When the accumulation period T_ACC is 16.6 [ms] and the clock period T_CNT is 1.7 [μs], the maximum measurable time TDC_FULL, which can be measured by the TDC circuit 215, is 9765. When the maximum count value C_MAX of the counter circuit 211 of the signal processing unit S11 connected to the high-sensitivity pixel P11 is 256, the restored pixel value C_RES is 752941 [LSB].

It is assumed that, in the configuration in FIG. 6, the time measurement values T_FULL after the count value of the counter circuit 211 of the signal processing unit S11 connected to the high-sensitivity pixel P11 reaches the full count value until the end of the accumulation period are 9801 and 9800. In other words, in a case where the times after start of accumulation until the count value reaches the full count value are 3 and 4, the restored pixel values are 640000 [LSB] and 859060 [LSB]. In contrast, in the configuration in FIG. 11, a number therebetween can be restored as the output pixel value. In other words, the resolution of the high luminance portion can be increased.

A method of restoring the pixel values of the pixels P00, P01, and P10 other than the high-sensitivity pixel P11 is described.

The respective count values of the signal processing units S00, S01, S10, and S11 are stored in the memory unit 1103 every time the count value of the counter circuit 211 of the signal processing unit S11 connected to the high-sensitivity pixel P11 is saturated during the accumulation period. Total sums of the count values of the signal processing units S00, S01, S10, and S11 during the accumulation period are respectively denoted by SUM_S00, SUM_S01, SUM_S10, and SUM_S11.

When ratios of the count values of the pixels to the count value of the high-sensitivity pixel P11 are respectively denoted by RAT_S00, RAT_S01, and RAT_S10, each of the ratios of the count values can be acquired as follows, $RAT\_S00 = SUM\_S00/SUM\_S11,$ $RAT\_S01 = SUM\_S01/SUM\_S11,$ and $RAT\_S10 = SUM\_S10/SUM\_S11.$ When the restored pixel value of the high-sensitivity pixel P11 is denoted by C_RES, respective restored pixel values C_RES_S00, C_RES_S01, and C_RES_S10 of the respective pixels P00, P01, and P10 connected to the respective signal processing units S00, S01, and S10 are restored as follows, $C\_RES\_S00 = C\_RES \times RAT\_S00,$ $C\_RES\_S01 = C\_RES \times RAT\_S01,$ and $C\_RES\_S10 = C\_RES \times RAT\_S10.$ As described above, the respective count values of the signal processing units S00, S01, S10, and S11 are stored in the memory unit 1103 every time the count value of the counter circuit 211 of the signal processing unit S11 connected to the high-sensitivity pixel P11 is saturated during the accumulation period. Then, the pixel values are restored from the ratios of the count value of the high-sensitivity pixel P11 and the count values of the other pixels after the end of the accumulation period.

It is concerned that a use amount of the memory is increased as the number of pixels becomes huge. Therefore, when the count value of the counter circuit 211 of the signal processing unit S11 connected to the high-sensitivity pixel P11 reaches the full count value for the first time, the ratios can be calculated from the count value of the high-sensitivity pixel P11 and the count values of the other pixels to be stored in the memory unit 1103, and the pixel values of the other pixels can be restored by multiplying the restored pixel value of the high-sensitivity pixel P11 by the ratios.

Further, the ratios of the count value of the high-sensitivity pixel P11 and the count values of the other pixels can be calculated from the count value of the high-sensitivity pixel P11 and the count values of the other pixels when the count value of the counter circuit 211 of the signal processing unit S11 connected to the high-sensitivity pixel P11 reaches the full count value, and the ratios can be stored in the memory unit 1103. Then, when the count value of the counter circuit of the signal processing unit S11 connected to the high-sensitivity pixel P11 reaches the full count value next, the ratios can be calculated again, and the ratios can be updated by, for example, calculating an average of the ratios stored in the memory 1103.

Although the present disclosure is described in detail above based on the exemplary embodiments, the present disclosure is not limited to the specific embodiments, and various modes without departing from the spirit of the present disclosure are also included in the present disclosure. A part of the above-described exemplary embodiments can be appropriately combined.

For example, FIG. 1 illustrates the structure in which the two semiconductor chips, the sensor chip and the circuit chip, are stacked; however, the pixel circuit area can be incorporated in the sensor chip. In other words, the stacked structure is not necessary.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-106531, filed Jun. 28, 2021, which is hereby incorporated by reference herein in its entirety.

What is claimed is:

1. A photoelectric conversion device, comprising:
a first pixel circuit including:
a first photoelectric conversion unit;
a first generation unit configured to generate a pulse signal based on a signal from the first photoelectric conversion unit; and
a first counter circuit configured to count the generated pulse signal; and
a second pixel circuit including:
a second photoelectric conversion unit;
a second generation unit configured to generate a pulse signal based on a signal from the second photoelectric conversion unit;
a second counter circuit configured to count the generated pulse signal; and
a time measurement circuit configured to measure a time,
wherein the first pixel circuit does not include a time measurement circuit, and
wherein the second pixel circuit selectively outputs one of a count value counted by the second counter circuit or a time measurement value measured by the time measurement circuit.

2. The device according to claim 1, wherein sensitivity of the second pixel circuit is higher than that of the first pixel circuit.

3. The device according to claim 1,
wherein the second pixel circuit outputs the count value and the time measurement value, and
wherein a pixel values of the first pixel circuit is restored from the count value and the time measurement value of the second pixel circuit.

4. The device according to claim 3, wherein, in a case where the count value of the second counter circuit of the second pixel circuit is saturated, the first counter circuits of the first pixel circuit stops.

5. The device according to claim 1, wherein the second pixel circuit further includes:
- a number-of-saturation-times counter configured to count a number of saturation times of the second counter circuit;
- a saturation time counter configured to count a total saturation time of the counter circuit; and
- a memory unit configured to store the number of saturation times and the total saturation time.

6. The device according to claim 5, wherein a pixel values of the first pixel circuit is restored from the number of saturation times and the total saturation time stored in the memory unit.

* * * * *